Feb. 21, 1939.   A. H. TEIGEN   2,148,180
TREATING WATER FOR CHICKS
Filed April 22, 1937
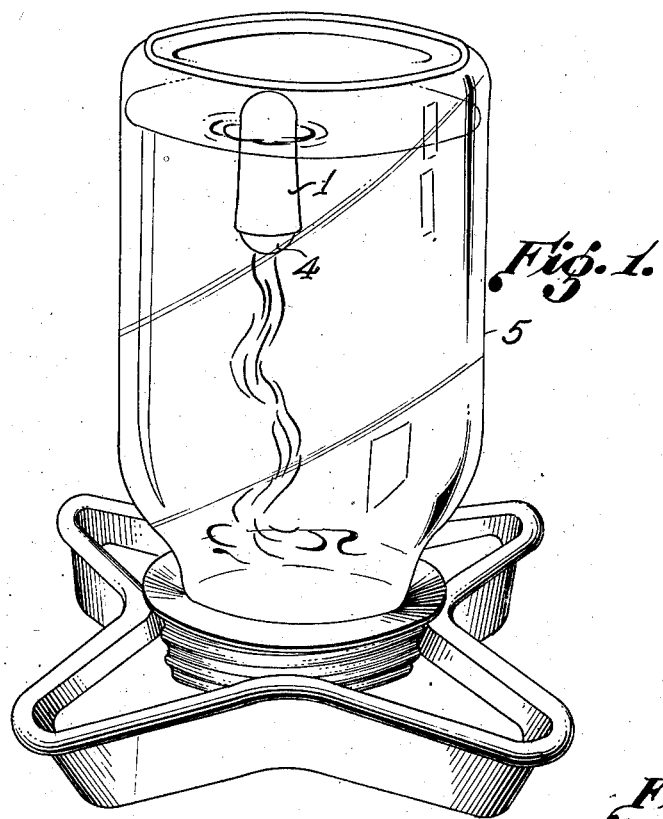
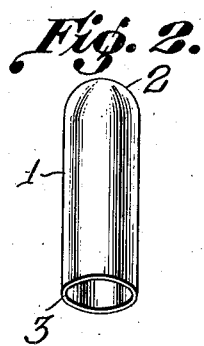
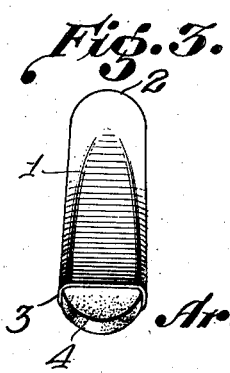
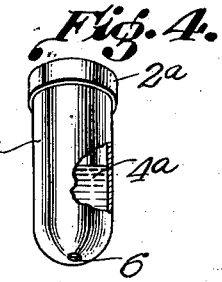
Inventor:
Arthur H. Teigen
by Augustus B. Stoughton.
Attorney Patented Feb. 21, 1939

2,148,180

UNITED STATES PATENT OFFICE 2,148,180

TREATING WATER FOR CHICKS

Arthur H. Teigen, Philadelphia, Pa., assignor to Pratt Food Co., Philadelphia, Pa., a corporation of Pennsylvania Application April 22, 1937, Serial No. 138,287

3 Claims. (Cl. 210—36)

The principal object of the present invention is to treat water, especially drinking water used in fountains for supplying chicks and other animals, in such a way that the first part of the water consumed by the chicks or other animals shall not be strong and distasteful, while the water which remains until later in the day has not lost the benefit or effect of the treatment, or become contaminated by feed, droppings and other organic matter which gets into the water and tends to neutralize the effect of the treatment. Another object of the invention is to treat the water in a drinking fountain from the top in such a way that the material employed and in solution descending in limited quantity toward the bottom of the fountain throughout the day, will neutralize feed and other organic matter entering the fountain at the bottom, and will be uniformly and intimately mixed with the water by the stirring action due to the entrance of air into the fountain as the chicks and other animals consume water from the bottom of the fountain. A third object of the invention is to treat drinking water for poultry and other animals in such a way that the concentration of the chemical in the water gradually increases as the amount of contamination increases.

Other objects of the invention will appear from the following description at the end of which the invention will be claimed.

To these and other ends hereinafter stated or appearing the invention comprises an elongated capsule closed at one end and open at the other end and a disinfectant or other chemical arranged in the capsule and confined to the open end of the capsule and adapted to contact with the water in which the capsule is adapted to rise to the surface and float in such a way that the disinfectant or chemical slowly admixes with the water and is effective from the top toward the bottom.

The invention also comprises the improvements to be presently described and finally claimed.

In the following description reference will be made to the accompanying drawing forming part hereof and in which:

Figure 1 is a perspective view illustrative of the invention.

Fig. 2 is a similar view of the capsule.

Fig. 3 is a similar view showing the capsule after the pellet has been inserted into it; and Fig. 4 is a similar view illustrating a modification.

Referring to the drawing, and more particularly to Figs. 1 to 3, 1 indicates a capsule closed at one end as at 2 and open at the other end as at 3. The capsule is composed of insoluble material and is comparatively light in weight, rubber, Celluloid and thin metal are examples of material from which the capsule can be made. 4 is a pellet of the material used for treating the water; it is slowly soluble or miscible in the drinking water. An example of the active constituent of the pellet is potassium permanganate compounded with a stable base for rendering the pellet slowly soluble for mixing with the drinking water with which it contacts.

The mode of operation may be described as follows: The capsule is slightly deformed as indicated in Fig. 3, and the tablet 4 is inserted. The deformation serves to retain the tablet 4 in place near the open end of the capsule, the closed end of the capsule provides space for air. When the fountain 5 is filled the capsule with the pellet 4 in it is put into the water and the result is that the capsule rises to the top of the water by reason of the air trapped in its closed end and floats in upright position with the tablet 4 immersed in the water. The tablet 4 being in contact with the water slowly dissolves or is admixed with the water; the result is that the active chemical potassium permanganate in the present example, slowly descends from the top to the bottom of the fountain, and this it continues to do for a considerable length of time, for example, a day. Chicks drinking out of the fountain introduce feed and contaminating organic matter into the water but the descending chemical neutralizes such matter so that the water is in proper condition throughout the day. Again, as chicks drink, air enters the fountain and bubbling up toward the top agitates the water and distributes the chemical. Furthermore, the concentration of the treated water is substantially uniform throughout the day with a tendency toward a gradual increase in concentration as the concentration of contaminating materials increases so that it is at no time unpalatable to the chicks and is at all times in desirable condition for them to drink it. The weight of the tablet 4 at the open end of the capsule is appropriate for causing the capsule to float in upright position and the air trapped in the closed end of the capsule imparts the necessary buoyancy.

The construction and mode of operation of the modifications shown in Fig. 4, are as above described except that the capsule 1a is provided at its open end with a suitably sized restricted aperture or apertures 6, and contains the chemical 4a in liquid or fluid form. As shown the closed end of the capsule 2a consists of a detachable cap that is useful in introducing the liquid 4a. When the capsule 1a is floating on the surface in the manner described the aperture 6 is submerged in the water and by reason of the small aperture 6 the liquid 4a is slowly admixed with the water.

In cases where a closed top fountain is not employed, the capsule may float at the surface of the drinking water which is slowly supplied with the chemical throughout the day.

It will be obvious to those skilled in the art that modifications may be made in details of construction and arrangement and in the chemical employed without departing from the spirit of the invention which is not limited in respect to such matters nor to matters of mere form or otherwise than the prior art and the appended claims may require.

I claim:

1. For slowly introducing chemicals from the top downward and for a comparatively long period of time into the water of drinking fountains for chicks and other animals, the combination of, an elongated hollow capsule closed at one end and open at the other end and a tablet slowly soluble in water and arranged in the capsule near the open end thereof, said tablet by its weight and in co-operation with the air trapped in said capsule being adapted to cause the capsule to rise to the surface of the water and to float in upright position with the tablet in contact with the water.

2. For slowly introducing a chemical from the top downwards and for a comparatively long period of time into a supply of drinking water for chicks and other animals, a hollow capsule closed at one end and open at the other end, and a chemical arranged in the capsule and confined to the open end thereof and adapted to contact with the water in which the capsule is adapted to rise and float.

3. For use in treating drinking water for chicks and other animals, the combination of, a hollow capsule closed at one end and open at the other end and of generally circular form in cross section at the open end and a tablet adapted for insertion and for retention at the open end of the capsule by deformation of the wall of the capsule.

ARTHUR H. TEIGEN.